US012508620B2

(12) United States Patent
Cacoub

(10) Patent No.: US 12,508,620 B2
(45) Date of Patent: Dec. 30, 2025

(54) WATER JET KIT FOR RECREATIONAL PURPOSES

(71) Applicant: EURO-MÉDITERRANÉENNE DE TOURISME RÉSIDENTIEL ET DE SERVICES, Paris (FR)

(72) Inventor: Alain Cacoub, Paris (FR)

(73) Assignee: EURO-MÉDITERRANÉENNE DE TOURISME RÉSIDENTIELET DE SERVICES, Paris (FR)

( * ) Notice: Subject to any disclaimer, the term of this patent is extended or adjusted under 35 U.S.C. 154(b) by 614 days.

(21) Appl. No.: 17/604,889

(22) PCT Filed: Apr. 8, 2020

(86) PCT No.: PCT/EP2020/059945
§ 371 (c)(1),
(2) Date: Oct. 19, 2021

(87) PCT Pub. No.: WO2020/212209
PCT Pub. Date: Oct. 22, 2020

(65) Prior Publication Data
US 2022/0212222 A1 Jul. 7, 2022

(30) Foreign Application Priority Data
Apr. 19, 2019 (FR) ...................................... 1904245

(51) Int. Cl.
*B05B 17/08* (2006.01)
*B05B 1/20* (2006.01)
(Continued)

(52) U.S. Cl.
CPC .............. *B05B 17/085* (2013.01); *B05B 1/20* (2013.01); *B05B 1/323* (2013.01); *B05B 12/06* (2013.01); *B05B 14/00* (2018.02); *B05B 15/625* (2018.02)

(58) Field of Classification Search
CPC ........... B05B 1/20; B05B 1/323; B05B 12/06; B05B 15/625; B05B 17/085; B05B 14/00; B05B 1/14; B05B 1/326; B05B 12/006
(Continued)

(56) References Cited

U.S. PATENT DOCUMENTS 3,174,688 A * 3/1965 Chatten .................. G09F 13/24 D11/131
3,212,713 A * 10/1965 Chatten .................. B05B 17/08 D26/81
(Continued)

FOREIGN PATENT DOCUMENTS

CN 2643041 Y 9/2004
CN 207371738 U * 5/2018 .............. B05B 1/18
(Continued)

OTHER PUBLICATIONS

International Search Report issued on Jul. 7, 2020 in corresponding International application No. PCT/EP2020/059945; 5 pages.

*Primary Examiner* — Joseph A Greenlund
*Assistant Examiner* — Anna Thi Ho
(74) *Attorney, Agent, or Firm* — Maier & Maier, PLLC

(57) ABSTRACT

A water jet kit for recreational purposes, including: a water collection tank having a trough in an upper portion including at least a first opening in communication with a lower tank to collect water flowing into the trough, a water outlet tank above the collection tank, including water outlet nozzles and at least one opening in a lower face of the outlet tank, oriented towards the collection tank, water exiting the nozzles forming a curtain of water, a supply column for the outlet tank, of rigid and translucent material, having a first end fitting into a second opening of the collection tank and a second end fitting into the opening of the outlet tank, the supply column enabling the outlet tank to be held above the
(Continued)

collection tank, a pump for sucking water collected in the tank and injecting it into the supply column to replenish the outlet tank.

22 Claims, 10 Drawing Sheets

(51) Int. Cl.

| | |
|---|---|
| ***B05B 1/32*** | (2006.01) |
| ***B05B 12/06*** | (2006.01) |
| ***B05B 14/00*** | (2018.01) |
| ***B05B 15/625*** | (2018.01) |

(58) Field of Classification Search
USPC ........................................................... 239/23
See application file for complete search history.

(56) References Cited

U.S. PATENT DOCUMENTS

| | | | | |
|---|---|---|---|---|
| 3,455,509 | A * | 7/1969 | Balkin | B05B 17/08 239/18 |
| 3,568,927 | A * | 3/1971 | Scurlock | G09F 13/24 239/18 |
| 3,912,166 | A * | 10/1975 | Chatten | F21S 10/002 239/20 |
| 5,005,762 | A * | 4/1991 | Cacoub | B05B 17/08 239/23 |
| 5,226,935 | A * | 7/1993 | Wolff | F24F 6/04 96/240 |
| 6,176,027 | B1 * | 1/2001 | Blount | G09F 19/00 40/406 |
| 6,311,898 | B1 * | 11/2001 | Gruff | F21S 8/00 40/406 |
| 7,861,942 | B2 * | 1/2011 | Damon | B05B 17/085 239/18 |
| 8,225,539 | B2 * | 7/2012 | Beebe | G09F 13/22 40/406 |
| 2002/0040938 | A1 * | 4/2002 | Nakayama | B05B 17/085 239/22 |
| 2005/0258268 | A1 * | 11/2005 | Watson | F21V 33/00 239/23 |
| 2008/0094821 | A1 * | 4/2008 | Vogtner | F21V 33/004 362/101 |
| 2011/0079665 | A1 * | 4/2011 | Lunde | B05B 17/08 239/562 |
| 2014/0034746 | A1 * | 2/2014 | Tom | B05B 17/085 239/22 |
| 2015/0083819 | A1 * | 3/2015 | Cibulski | F21S 10/002 239/17 |
| 2018/0117613 | A1 * | 5/2018 | Zito, Jr. | B05B 1/02 |
| 2018/0214902 | A1 * | 8/2018 | Focaccia | B05B 1/20 |
| 2021/0046500 | A1 * | 2/2021 | Huang | E04H 4/14 |

FOREIGN PATENT DOCUMENTS

| | | | | |
|---|---|---|---|---|
| FR | 2625116 A1 * | 6/1989 | | B05B 17/00 |
| KR | 2020090009842 U | 9/2009 | | |
| WO | WO-2011051601 A1 * | 5/2011 | | B05B 17/085 |

* cited by examiner

WATER JET KIT FOR RECREATIONAL PURPOSES

FIELD

The invention relates to a water jet device for recreational purposes, for example of the fountain type or the like.

BACKGROUND

Known from the prior art are such devices with cascading water jets forming in particular a curtain of water. Such a device usually comprises several water outlets distributed along one direction, for example along a tube which may be rectilinear, so that the set of jets forms said curtain of water.

A form of water jet device can give pleasure to users, not only visual or auditory (from the sound of falling water), but also to cool off, with it being possible for users to position themselves as illustrated in FIG. 10. This embodiment of the jet device would allow a user to install his or her device in different types of indoor or outdoor environments.

However, in the usual devices of this type, the jets JET (reference in FIG. 10) are provided by the overflow of water from a tank 2 (called "water outlet tank" hereinafter) vertically aligned with a water receptacle 1 (called "water collection tank" hereinafter), and it is usually necessary to provide beams for fixing the tank 2 above the receptacle 1. However, such retaining beams can be unsightly and at least are visible, which clashes with the water curtain which is translucent.

The invention improves the situation.

SUMMARY

It proposes a water jet kit for recreational purposes, comprising:

- a water collection tank comprising a trough provided in an upper portion of the water collection tank, the trough comprising at least a first opening in communication with a lower tank comprised in the collection tank, in order to collect the water that has flowed into the trough,
- a water outlet tank, provided above the water collection tank, comprising a set of water outlet nozzles and at least one opening that is provided in a lower face of the water outlet tank and oriented towards the water collection tank, the water exiting the nozzles forming a curtain of water,
- at least one supply column for the outlet tank, made of a rigid and translucent material, comprising a first end configured to fit into a second opening of the water collection tank and a second end configured to fit into the opening of the water outlet tank, the supply column enabling the water outlet tank to be held above the collection tank,
- a pump, configured to suck the water that has flowed into the tank and to inject this water into the supply column in order to replenish the outlet tank with water.

Thus, in such an embodiment, said retaining beams are replaced by a (hollow) column which conveys the water from a collection tank to an outlet tank by means of the cooperation of the pump with this column. This column is advantageously made of a material that is rigid in order to support the outlet tank, and translucent in order to blend with the curtain of water generated by the flow of water from the outlet tank. The column thus has the following functions:

- supporting the outlet tank,
- conveying water to this tank,
- while being inconspicuous to an observer.

DETAILED DESCRIPTION OF THE DRAWINGS

Figure 5A:
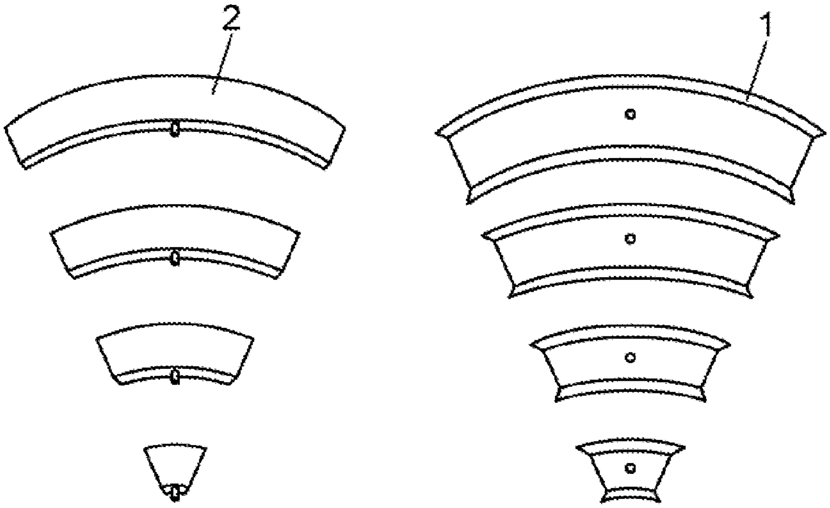

FIG. 5*a* shows a curved outlet and collection tank of different lengths.

Figure 5B:
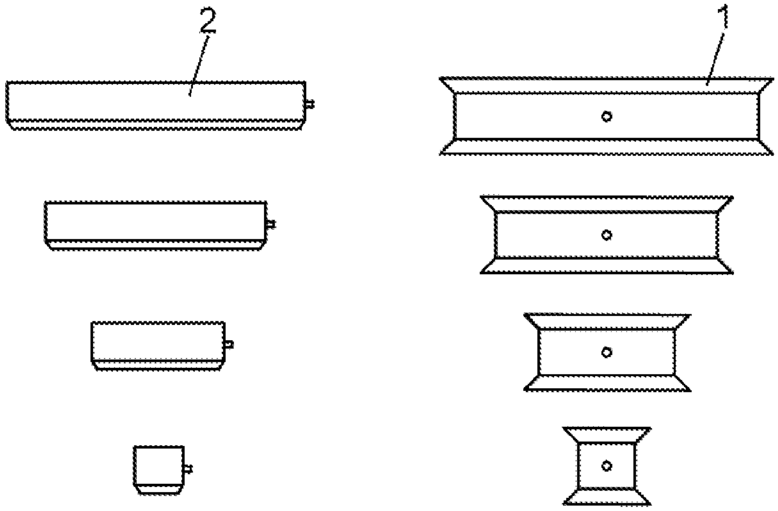

FIG. 5*b* shows a rectilinear outlet and collection tank of different lengths.

Figure 6A:
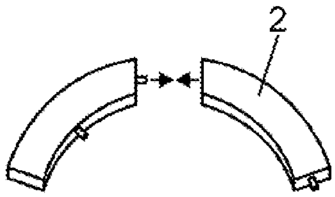

FIG. 6*a* shows the assembly of two identical outlet tanks by opposite side faces, in one embodiment.

Figure 6B:
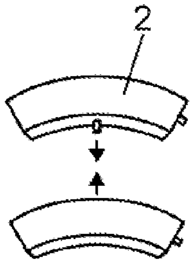

FIG. 6*b* shows the assembly of two identical outlet tanks by their counterpart side faces, in one embodiment.

Figure 6C:
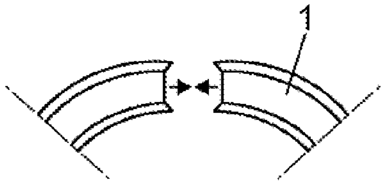

FIG. 6*c* shows the assembly of two identical collection tanks, in one embodiment.

FIGS. 7*a* to 7*g* illustrate different shapes of a homologous outlet tank and collection tank.

Figure 8A:
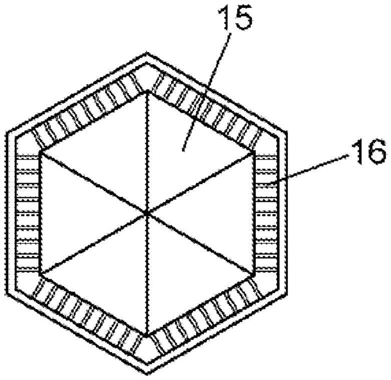

FIG. 8*a* illustrates a nozzle of the water jet head in one embodiment.

Figure 8B:
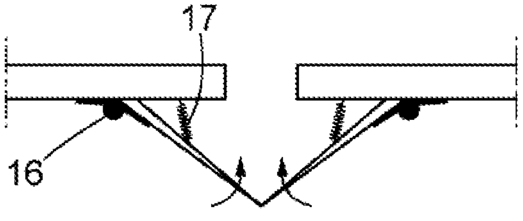

FIG. 8*b* shows a horizontal cross-section of the nozzle.

Figure 8C:
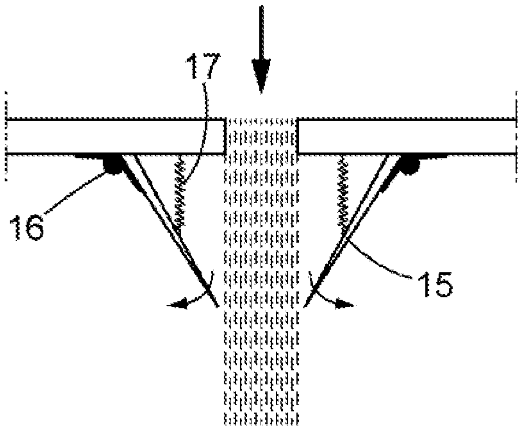

FIG. 8*c* shows a horizontal cross-section of the nozzle during operation.

Figure 9A:
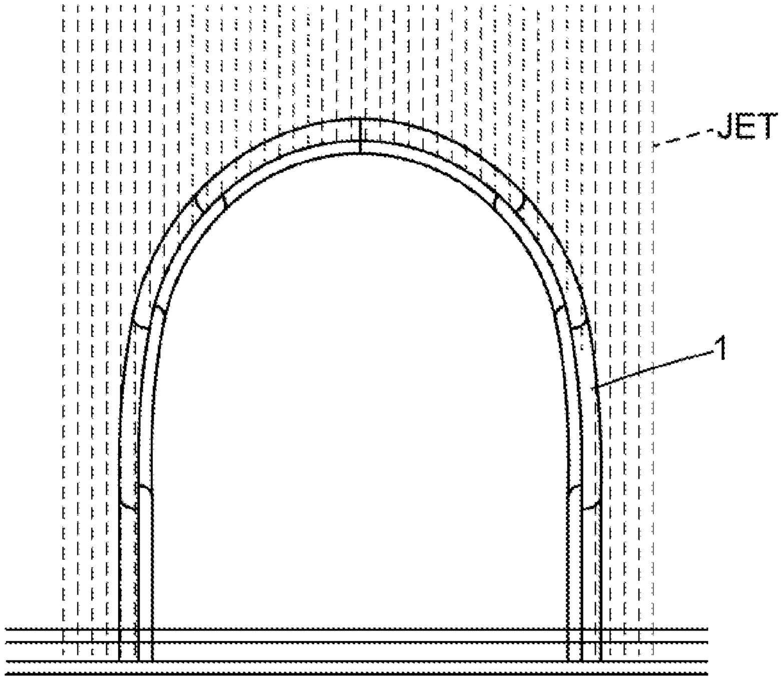
Figure 9B:
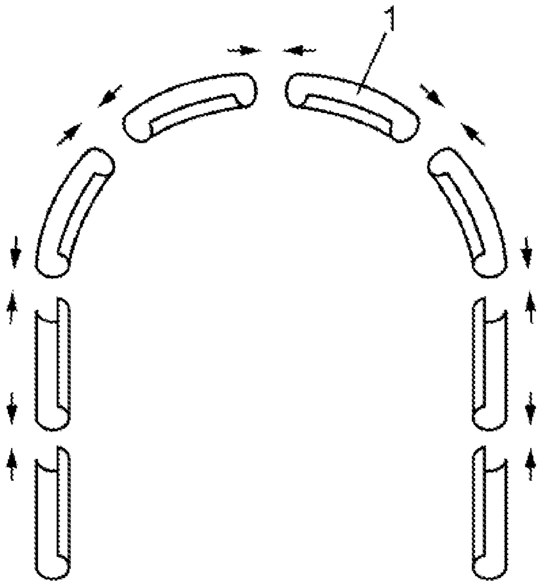

FIG. 9*a* and FIG. 9*b* show collection tanks assembled to create a passage which allows passing through the curtain of water.

Figure 10:
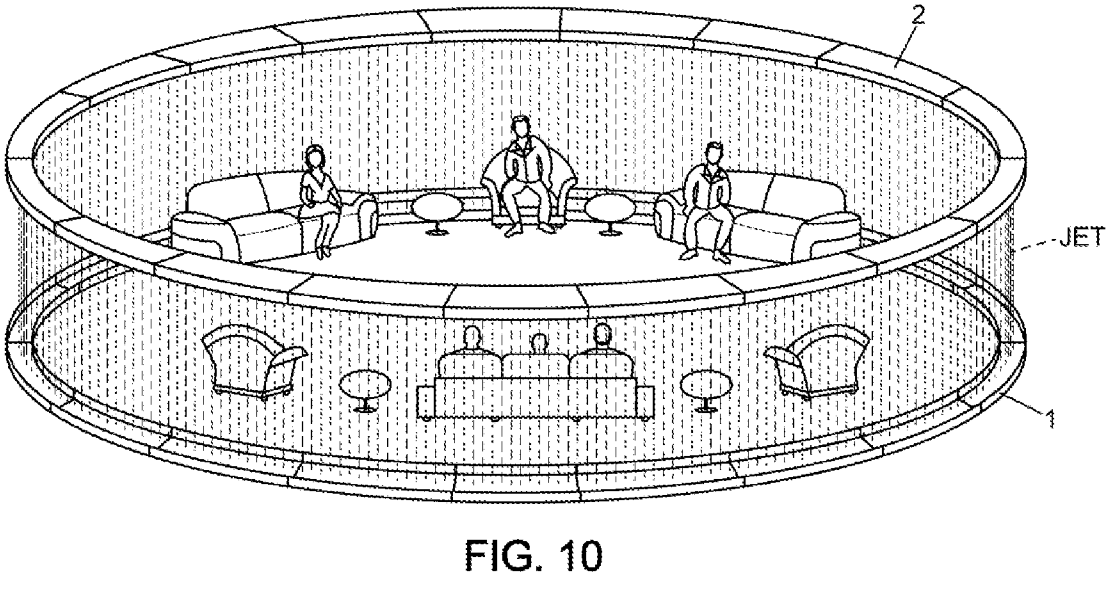

FIG. 10 shows one embodiment of the water jet kit.

Figure 11:
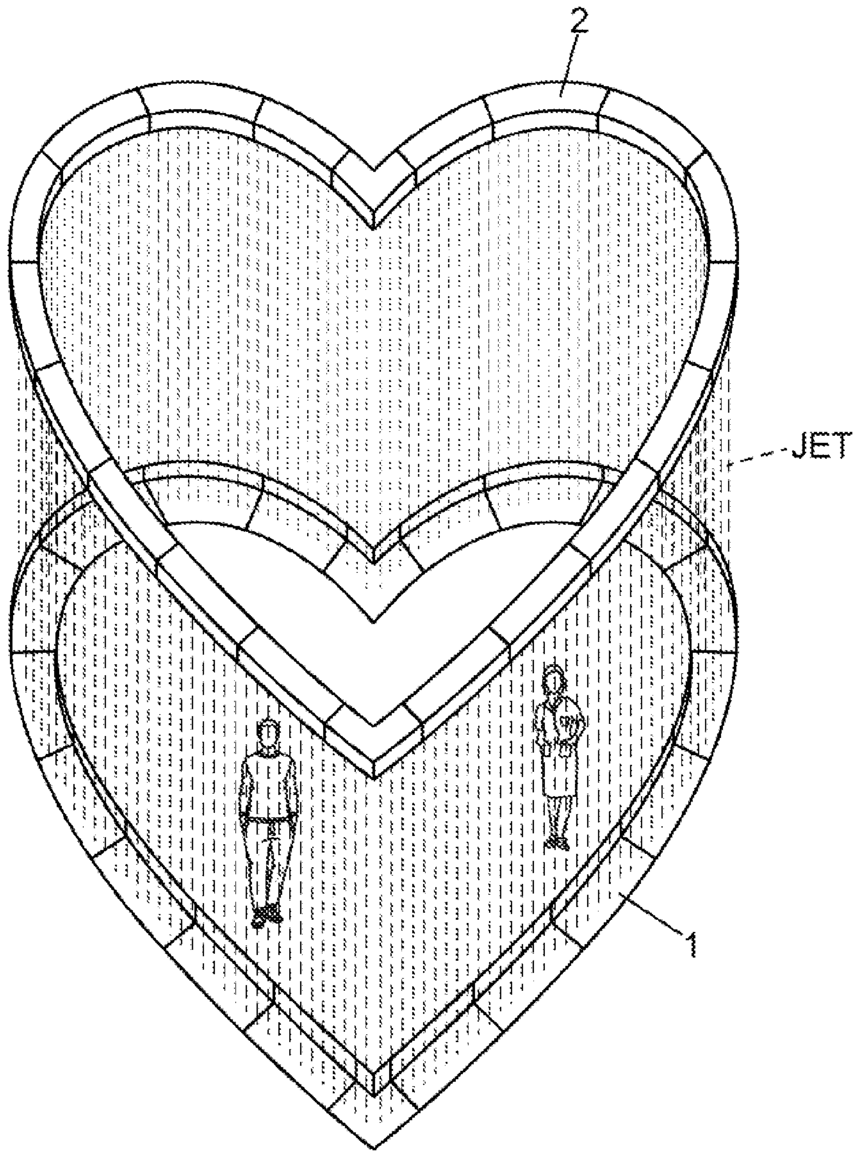

FIG. 11 shows a second embodiment of the water jet kit.

DETAILED DESCRIPTION

The invention relates in particular to a kit which combines an outlet tank and a collection tank with at least one water column. As will be seen below, it is then possible to fit together several successive outlet tanks and in a homologous manner several collection tanks, therefore in association with several respective translucent rigid columns, with a sufficient number of columns to support the number of water outlet tanks once fitted together.

Figure 2:
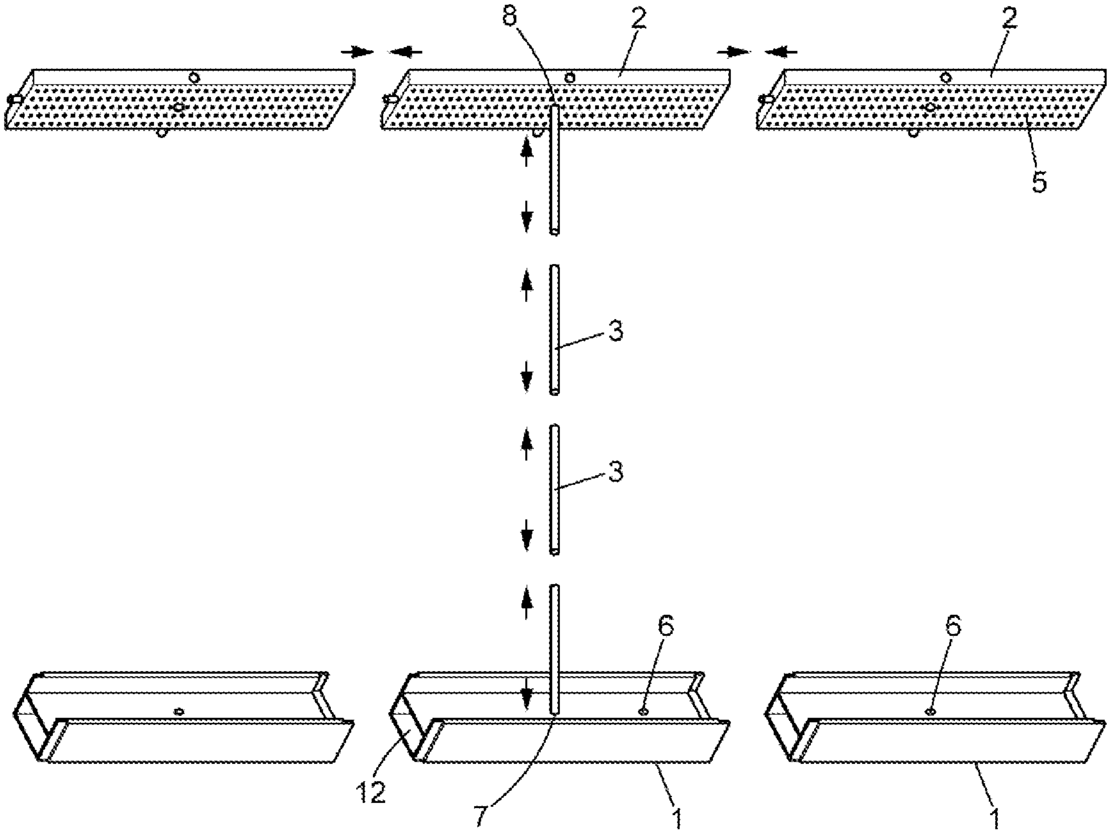
FIG. 2 shows an exploded view of the water jet kit.

Each supply column may be fixed (for example fitted together, for example snap-fitted or "clipped" hereinafter) at its lower end to the collection tank and at its upper end to the water outlet tank. The pump, which allows the water collected in the water collection tank to be conveyed to the outlet tank through the column, is directly connected to the supply column. The outlet tanks are able to be fitted together (by clipping into place or other means), for example by a connection between a tubing protuberance and a cavity respectively positioned on two outlet tanks (as illustrated at the top of FIG. 2 and in FIG. 3). Similarly, the water collection tanks are suitable for being assembled, for example, by a connection of the type comprising an internal recess and an external recess (as illustrated at the bottom of FIG. 2 and in FIG. 4) which, in one embodiment, can be provided on the water collection tanks. These various assemblies make it possible to create kits of different sizes and shapes as will be seen further below (as illustrated in FIGS. 10 and 11 as examples) or adaptable to a plurality of environments (for example along a bay window indoors or around a swimming pool outdoors). The user then has the possibility of creating their own kit according to their needs or expectations.

As illustrated at the bottom of FIG. 2, the water collection tank collects the water flowing from the water outlet tank positioned above, the water falling into the trough of the collection tank. The water can flow through one or more openings 6 of the trough leading to the reservoir 12 of the collection tank. Several openings may be provided for the flow of water, allowing water to be conveyed into the reservoir more quickly. Furthermore, the water collection tank comprises a second opening 7 for fixing the supply column 3. Similarly, this opening 7 may comprise an internal recess in order to fix one end of the column therein. Of course, several openings may be provided for fixing several columns in the water collection tank 1, thus enabling a more solid retention of the outlet tank 2 above the water collection tank.

Alternatively, a threading may be provided in the openings 7, for screwing the column ends therein.

Figure 4:
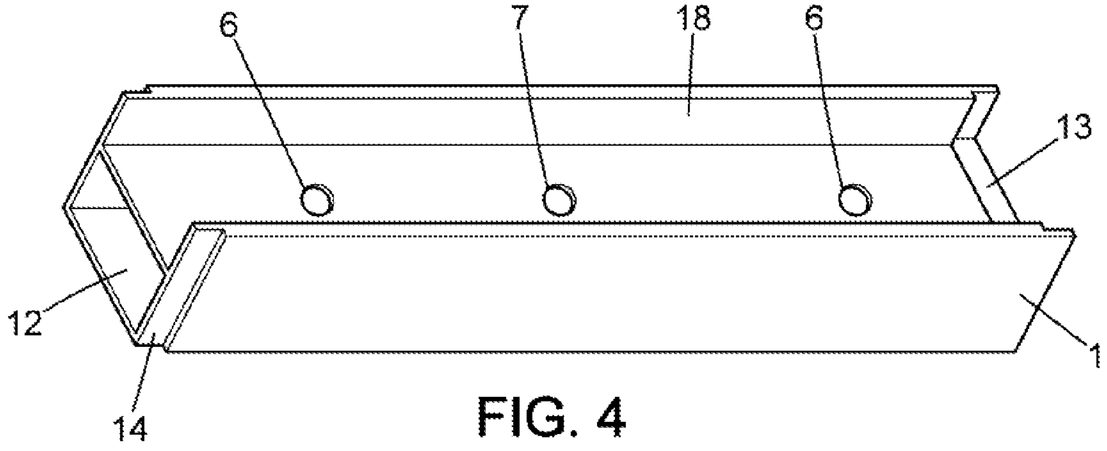
FIG. 4 shows a water collection tank.

In the embodiment shown by way of example in FIG. 4, the water collection tank 1 can then comprise an internal recess 13 in a first side face (right part of FIG. 4), and an external recess 14 in a second side face (left part of FIG. 4), the external recess being able to be housed in the internal recess of a second collection tank and the internal recess being able to receive the external recess of a third collection tank.

For example, when the collection tanks are rectangular and straight as shown in FIG. 4, the recesses can be made across the width of the tanks in order to lengthen the water collection surface. Alternatively, however, the collection tanks may include a tubing protuberance and a cavity on the side faces of the tank, opposite to each other (typically such as the water outlet tanks illustrated in FIG. 3).

Furthermore, the collection tanks are, at least in an upper portion, of a deformable rigid material making it possible to clip them to each other. However, a more flexible material may be used for the lower portion of the collection tank (the underside of the reservoir 12 as illustrated in FIG. 4), making it possible to adapt to irregularities of the ground and keep the kit upright (typically in outdoor use).

For example, this flexible material can be chosen so that it floats on water, to allow its use in a swimming pool for example, enabling the kit to float on water and use the water from the pool as its water supply.

Regarding the water outlet tank, this tank may comprise a plurality of water outlet nozzles positioned on the lower surface of the water outlet tank and in a same plane. The nozzles may be equidistant from each other and distributed over the entire surface in order to obtain a curtain of water, or distributed over only part of the lower surface of the tank, for example to allow a user to pass underneath the tank without being sprayed.

The nozzles may be holes drilled in the thickness of the material of the water outlet tank to allow water to flow continuously to the outlet tank, or in another embodiment for example, the water outlet tank may be fitted with connected nozzles making it possible to obtain different forms of jets (typically in jets forming segments, dashes, or drops).

The outlet tank and the collection tank are of homologous shapes (straight rectangular but alternatively may be polygonal, angular, straight or curved).

Figure 3:
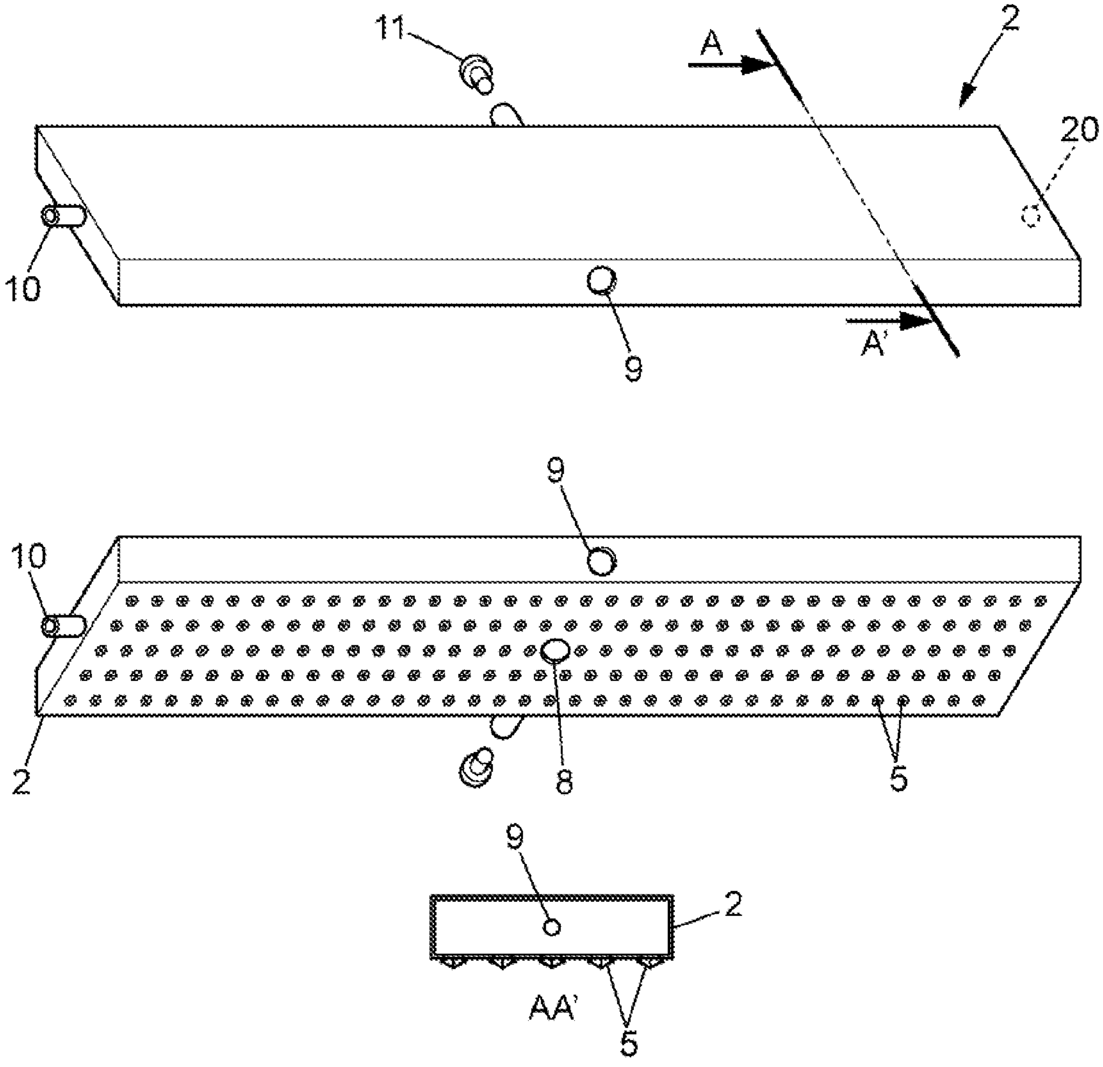
FIG. 3 shows a water outlet tank.

Furthermore, as illustrated in FIG. 3, the water outlet tank may comprise, on its side faces, a tubing protuberance 10 on the one hand (left part of FIG. 3) and a cavity on the other hand (right part of FIG. 3), the tubing being able to be housed in the cavity of a second water outlet tank and the cavity being able to receive the tubing of a third water outlet tank for example.

Thus, in one embodiment of the invention, the kit comprises at least first and second outlet tanks, the first outlet tank comprising a cavity on a first side face, and the second outlet tank comprising, on a first side face, a tubing protuberance suitable for being housed in the cavity of the first outlet tank.

In one embodiment of the invention, the kit may further comprise at least a third outlet tank, intermediate between the first and the second outlet tank, comprising:

- on a first side face, a tubing protuberance suitable for being housed in the cavity of the first outlet tank, and
- on a second side face, a cavity suitable for receiving the tubing protuberance of the second outlet tank.

In one embodiment of the invention, the first side face is opposite to the second side face.

Such an embodiment may require several water supply columns in order to maintain the water outlet tanks at their height, the outlet tanks thus being stable in order to obtain a flow without disruptions.

The tubing of a first tank can be housed in the cavity of a second outlet tank of the same or different shape, making it possible to create kits of original shapes such as heart-shaped for example (in a manner similar to the shapes of the water collection tanks illustrated in FIGS. 5 to 7).

In one embodiment of the invention, the third outlet tank comprises, in addition to the first and second side faces, at least a third side face comprising one element among:

- a tubing protuberance suitable for being housed in an outlet tank cavity, and
- a cavity suitable for receiving a tubing protuberance of an outlet tank.

A cavity is mounted on a first face of the outlet tank, this first face being opposite to a second face where for example a tubing protuberance is mounted. This arrangement allows "end-to-end" assembly between a plurality of water outlet tanks, the cavity of one outlet tank receiving the protuberance of another outlet tank.

In one embodiment, a third side face of an outlet tank may comprise a protuberance or a cavity and allow connecting a fourth outlet tank. The third outlet tank can then be triangular in shape, for example, making it possible to create intersecting water curtains when water flows through the various water outlet tanks.

The outlet tanks may be x-shaped, angular, or have a general "V" shape, to implement the preferred shapes.

In one embodiment of the invention, one among the first and second water outlet tanks comprises, on a second side face opposite to the first side face, a partition for closing off the outlet tank.

For example, a rectangular outlet tank may be arranged at only one of these side faces to receive a second outlet tank at one of these ends and to close off the assembly line of tanks at a second end opposite to the first. "Close off" is understood to mean stopping the flow of water within the tanks.

Special shapes for these outlet tanks can be provided, such as a pointed shape or a horn shape for example.

The outlet tanks are preferably rigid to allow containing the water higher up, before it flows through the nozzles.

The tanks (outlet or collection) may have a straight parallelepiped shape (in the shape of a rectangle when viewed from above, as illustrated in FIG. 5*b*) or curved (as illustrated in FIG. 5*a*).

It will thus be understood that the assembly of tanks two by two generates a continuous line as illustrated in FIG. 10 (here a circular, elliptical, or oblong shape).

Figure 7A:
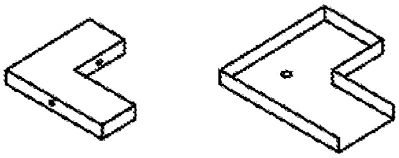
Figure 7B:
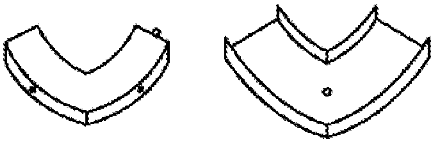
Figure 7C:
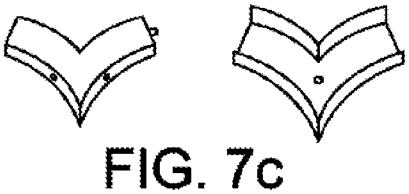
Figure 7D:
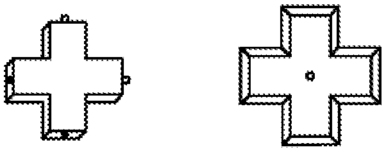
Figure 7E:
Figure 7F:

Alternatively, a singularity may be provided in the line created by the assembly of tanks (such as the heart illustrated in FIG. 11). In this case, at least one of the tanks has a different shape from the other tanks, possibly:

- a discontinuous shape such as the tank illustrated in one of FIGS. 7*a* and 7*d*, or
- such that its side faces forming the connections with other tanks are not opposite faces, as in the example of FIG. 7*f* where two (or three) lines of tanks can be connected to a polygonal tank (triangular, square, or other shapes) comprising several functional adjacent side faces (with connections for the flow of water to other tanks).

The tubing protuberance of the outlet tank and of the collection tank may be hollow, in order to allow the water injected by the supply column to be distributed among the various assembled tanks. Alternatively, the non-functional pipes can be plugged with a stopper (for example of rubber) in the event that no second tank is assembled to this face of the collection tank.

For sealing concerns between the various tanks (here we mean between two water collection tanks or two water outlet tanks) a flexible gasket (typically rubber) can be provided and placed between the two tanks.

The water supply column, made of a rigid and translucent or transparent material to support the water outlet tank (typically a polymer for example of plexiglass, glass, or other), here is straight and of the same shape as the jets in order to blend with the jets coming from the outlet tank. The column can be placed for example at the center of the tanks or alternatively at least two columns can be provided at the respective sides of the water collection tank.

The column may comprise several column elements, fitting together (by threading or by clipping), in order to increase the height of the water outlet tank relative to the water collection tank.

Alternatively, a threading system may be provided for assembling two column elements or one column element to one of the tanks, the column comprising an internal thread at a first end and an external thread at a second end. The external thread of a first column element is able to screw into the internal thread of a second column element.

The pump is connected to the column in order to suck water from the collection tank and inject it into the supply column. The injected water enters the water outlet tank and flows through the nozzles, for example in straight jets directed towards the water collection tanks. The pump may be directly positioned in the reservoir 12, making it possible to render it invisible to the user's eyes. This embodiment optionally allows water to circulate in a closed cycle. The reservoir of the collection tank can be pre-filled with water by the user, the water being in constant circulation without an external supply. The pump itself can be powered electrically by a connection to the grid or alternatively by photovoltaic modules, particularly in an application in an outside environment.

Alternatively, an external water supply to the tanks may be provided (for example in an outdoor environment such as a garden, where the user can use a garden hose) and connected to the water collection tank at one of the openings. This circulation, with an external water supply, allows a continuous water supply when external elements such as wind can disrupt the direction of the water jets and create water loss.

The water collection tanks may further have a curved shape with the curvature as shown in FIG. 9 in order to rise from the ground and form an unencumbered opening allowing the user to pass through without being sprayed. The collection tanks can then be mounted vertically, for example, to create such a "passage" allowing water to flow only above and to the sides of the passage. Square and rectangular elements are used for right-angle passages for example. Circular and oblique elements can be used to create rounded passages (FIGS. 9*a*, 9*b*).

Thus, in such an embodiment, said third intermediate collection tank, at least, is shaped to be higher relative to at least one among the first and second tanks (which are on the sides) in order to generate a passage with no water flowing under this third tank. Such an embodiment is advantageous for devices of the ornamental fountain type, but also for carrying out, for example, maintenance work on pre-existing fountains (city or other), this passage then allowing workers to test the water jets and to move under them without being sprayed. Thus, in such a case, the third intermediate tank (or successive intermediate tanks) can be shaped to create this passage, and for example can be curved along its length for this purpose, as illustrated in FIG. 9*b*. Such a feature is advantageous as such, independent of the setting of an ornamental fountain, and as such may potentially be the object of separate protection.

The water outlet tanks may alternatively be equipped, for example, with presence sensors making it possible to cut off the flow of water when the user stands in front of the curtain of water.

It should be noted that a collection tank may comprise, as illustrated in FIG. 5*a*, in addition to the first and second side faces, at least a third side face comprising one among:

- a tubing protuberance suitable for being housed in a recess of the collection tank, and
- a cavity suitable for receiving a tubing protuberance of a collection tank.

The protuberance and the cavity being positioned at the level of the reservoirs of the collection tanks (here meaning the lower portion of the water collection tanks), allowing the flow of water between the various tanks connected by this third side face, the protuberance being hollow.

Such an embodiment typically makes it possible to enlarge the water collection surface (especially outdoors in windy conditions).

In one embodiment of the invention, at least one among the first and second water collection tanks comprises, on a second side face opposite to the first side face, a partition for closing off the water collection tank.

In one embodiment of the invention, the supply column is created from a plurality of segments comprising:

- a first segment comprising, at at least one end, an internal recess, and
- a second segment comprising, at at least one end, an external recess suitable for being housed in the internal recess of the first segment.

The various column elements fit into each other in order to increase the height of the water outlet tank relative to the water collection tank, and therefore to adapt to the environment where the kit is installed.

In one embodiment of the invention, the supply column comprises at least a third segment, intermediate between the first and second segment, comprising:

- an external recess at a first end, suitable for being housed in the internal recess of the first segment, and
- an internal recess at a second end, suitable for receiving the external recess of the second segment.

In one embodiment of the invention, the kit further comprises:

a flow regulator arranged to increase the flow rate of water from a water infeed, in the event of detecting a pressure in the outlet tank below a predetermined threshold, a pressure gauge cooperating with the flow regulator to measure pressure in a water outlet tank.

The pressure gauge may be placed in the water outlet tank or at the outlet of the supply column, making it possible to measure the pressure of the water arriving from the supply column or in the outlet tank. If the pressure in the water outlet tank, measured by the pressure gauge, is lower than a defined threshold (this threshold can be defined so as to obtain a continuous flow of water for example), the flow regulator increases the flow of water by controlling the water supply connected to the water collection tank so as to return to the minimum threshold.

In one embodiment of the invention, the flow regulator is configured to cut off the supply of water to the nozzles cyclically, and to cause a cyclically interrupted jet to exit each nozzle.

In an alternative or complementary embodiment, the kit comprises, at each nozzle outlet of the outlet tank, at least one outwardly opening valve, hinged and urged inward by a spring.

The water outlet comprises a multitude of nozzles allowing water to flow through. The nozzles are composed of several valves connected by a hinge to the outlet tank on the external face of the valves and of the outlet tank. The nozzle valves are also attached to the tank by a spring placed on the underside of each valve and attached to the internal face of the tank. The water pressure in the outlet tank enables the valves to open during the flow of water (the nozzles being in the open position), the valves returning to their initial position (i.e. nozzle in the closed position) when the water pressure becomes insufficient, thus creating jets of water interrupted by cycles, forming segments or drops.

Thus, in this embodiment, the flow regulator is formed by said valves, in cooperation with the water infeed, and:

a pressure greater than a threshold, for the water coming from the supply column into the outlet tank, causes the valves to open, and after the valves open, the release of water from the outlet tank generates a drop in water pressure in the outlet tank and causes the valves to close.

In one embodiment of the invention, the kit comprises an anemometer to identify the wind direction and force and then increase the water flow rate.

In a less sophisticated embodiment, the device may simply comprise at least one sensor for detecting the presence of wind and at least cyclically interrupting the water jet according to the force of the wind, into successive water segments or drops.

More generally, a sensor for detecting an air displacement (due to wind, or, for example, simply inside a room due to turning on a fan or other cause) may be provided, and if the force of the detected air displacement is greater than a threshold, the operation of the pump can be completely cut off to eliminate the risk, for example, of spraying users near or under the fountain.

Figure 1:
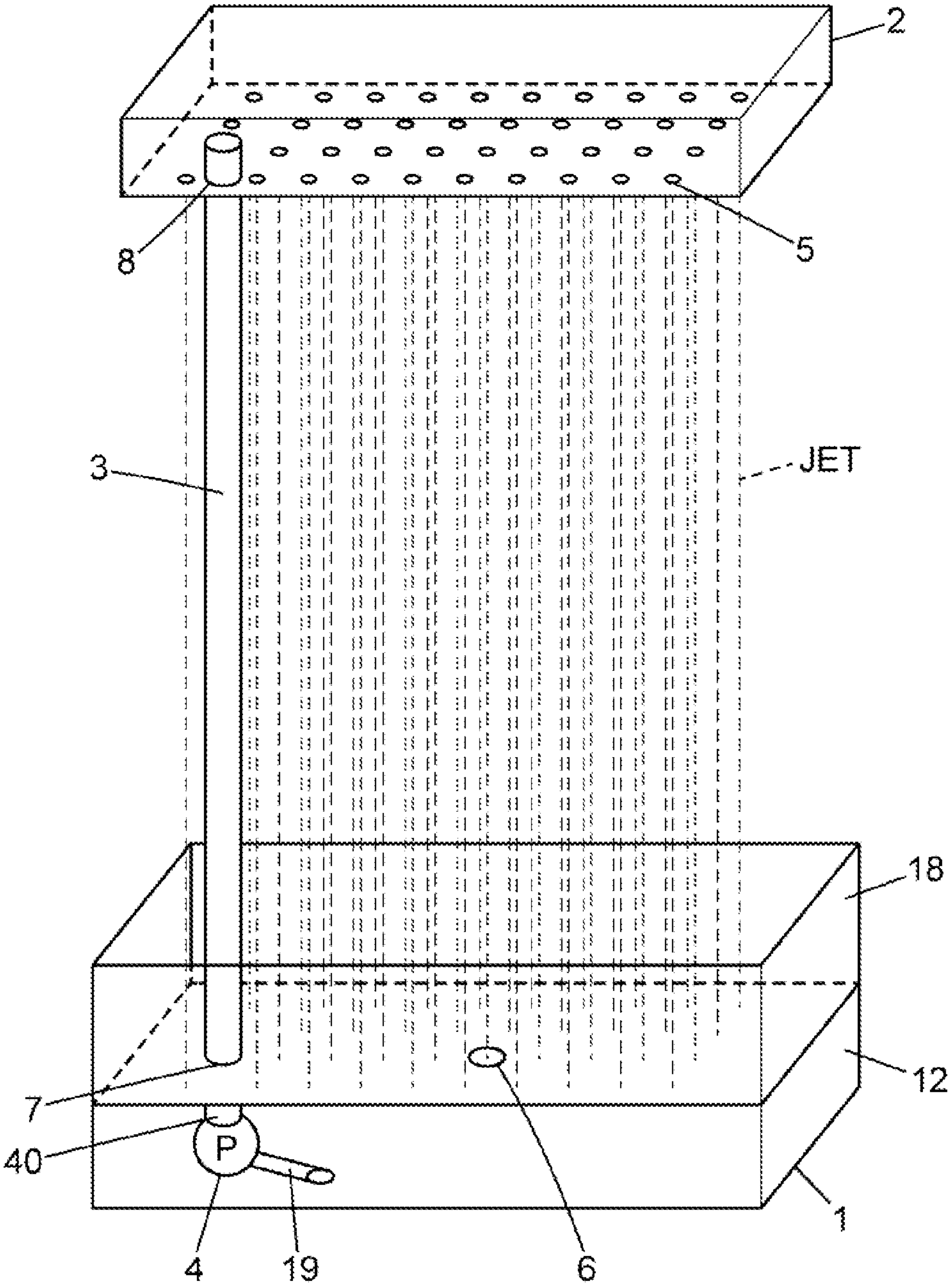
FIG. 1 shows an embodiment of a water jet kit for recreational purposes, within the meaning of the invention, during operation.

Other features, details and advantages will be apparent from reading the detailed description below, and from analyzing the accompanying drawings, in which:

FIG. 1 shows a water jet kit. This kit includes:

a water collection tank 1, a water outlet tank 2, a supply column 3, a pump 4, nozzles 5, a water collection opening 6, an opening 7 suitable for receiving the column 3 on the upper face of the water collection tank 1, an opening 8 suitable for receiving the column 3 on the lower face of the water outlet tank 2, a reservoir 12, and a trough 18.

In particular, the column 3 comprises a lower end suitable for insertion by force into the opening 7 of the collection tank 1, preferably all the way to a tubing 40 of larger diameter 40 connected to the pump 4. For example, the opening 7 and the outlet tubing 40 of the pump 4 can be of a diameter greater than that of the column 3 or the column 3 may comprise an external recess to be fitted through the opening 7 all the way to the tubing 40. The pump 4 comprises another tubing leading to the bottom of the reservoir 12 in order to suck in water from the bottom of the reservoir and reinject it into the outlet tubing 40 receiving the column 3. In addition, an upper end of the column 3 can be inserted by force into an opening 8 of the water outlet tank in order to supply it with water. For example, this second upper end may comprise an external recess for insertion into the opening 8 of the outlet tank 2.

In the example of FIG. 1, the outlet tank 2 and the collection tank 1 are rectangular in shape and held one above the other by the column 3 which may be located at the center of the tanks or be offset horizontally relative to the centers of the tanks as illustrated by way of example in FIG. 2, possibly providing a second column 3 (not shown) symmetrically positioned, so as to ensure stable retention of the water outlet tank.

The water outlet tank 2 comprises a plurality of nozzles 5 on its lower face, generating a curtain of water when the water flows through the nozzles 5, the column 3 blending in with this curtain (being transparent or translucent). The nozzles are distributed over the entire surface of the lower face of the outlet tank 2, equidistant from one another. In a variant, the nozzles may be distributed only along an edge of the tank 2, close to a side partition, or even on a side partition and not on the lower face so as to give a dome effect to the curtain of water falling from the outlet tank 2.

The water, falling from the outlet tank 2, reaches the trough 18 of the water collection tank 1, and here this trough 18 has at least one hole 6 in its lower face in order to collect the water from the trough into the underlying reservoir 12. Such an embodiment makes it possible to filter from the water any debris or dust which could land in the trough 18. Furthermore, the reservoir 12 contains the pump 4 placed at the inlet of the column 3, leaving the pump invisible to the user's eyes.

The kit is supplied with water by filling the reservoir 12 beforehand or by connecting an additional water infeed, for example via one of the openings 6 of the water collection tank 1 for example, using for example a garden hose when the kit is placed outdoors.

FIG. 2 shows how the various elements (outlet tanks 2, collection tanks 1, column 3) of a water jet kit within the meaning of the invention fit together, then comprising more than one outlet tank 2 or collection tank 1. As can be seen in FIG. 3, the outlet tanks 2 comprise, on a first side face (to the left in FIG. 3), a protuberance 10 in the form of hollow tubing (possibly covered by a rubber gasket) and on a second opposite side face (to the right in FIG. 3), a cavity 20 for receiving the tubing 10 of another tank 2. Again with reference to FIG. 2, the protuberance of the central tank fits into the cavity of the first tank. The cavity of the central tank receives the protuberance of the second tank in its opposite side face. The assembly of the three water outlet tanks 2 then forms a rectilinear unit creating a curtain of water.

The upper face of the outlet tank 2 is closed off. The outlet tank 2 may further comprise at least one plug 11 making it possible to close off the tubing protuberances in the event that no assembly with another outlet tank is performed.

Referring now to FIG. 4, the water collection tank 1 comprise an external recess 14 at a first lateral end, and an internal recess 13 at a second opposite lateral end. The external recess 14 of a central collection tank 1 is housed in the internal recess 13 of another water collection tank as illustrated in FIG. 2, again forming a homologous rectilinear unit for receiving the curtain of water.

The column 3 may be composed of several column elements, as illustrated in FIG. 2.

The first column element is inserted at a first end into the central collection tank 1 (in the center of the tank in the example shown here) and at a second end into a second column element. Several column elements can be assembled together and a last column element is inserted into an opening of the outlet tank 2. The assembly of column elements allows water to be conveyed from the opening 7 of the collection tank 1 to the opening 8 of the outlet tank.

FIGS. 5*a* to *c* show the water outlet tank 2 and collection tank 1 in different shapes and lengths; these tanks may be:

curved (as illustrated in FIG. 5*a*), rectilinear and rectangular (as illustrated in FIG. 5*b*), ranging from rectangle to square depending on the chosen length of the tank.

FIGS. 6*a* to *c* show various ways to assemble the tanks.

FIG. 6*a* shows the assembly of two curved outlet tanks 2. The first outlet tank 2 has a protuberance on one of its side faces (in the case shown, the side face corresponds to the side representing the width of the tank), which is inserted into the cavity of a second outlet tank 2 on one of its side faces. This embodiment makes it possible to length the curtain of water.

FIG. 6*b* shows a second way to assemble two curved outlet tanks 2. The first outlet tank 2 comprises a protuberance on the internal length of the first outlet tank 2, which is inserted into the cavity of a second outlet tank 2 (present along its external length). This embodiment makes it possible to widen the curtain of water.

FIG. 6*c* shows one way of assembling two curved water collection tanks 1. The first collection tank 2 comprises an external recess on a first side face (face corresponding to a width of the tank) which is received in the internal recess of the second collection tank 2.

FIG. 7*a* shows a water outlet and collection tank forming a 90 degree angle in order to form a perpendicular curtain of water.

FIG. 7*b* shows an outlet and water collection tank similar in shape to a "U", enabling the creation of a pointed oval-shaped kit.

FIG. 7*c* shows an outlet and water collection tank similar in shape to a "v", enabling the creation of a heart-shaped kit as illustrated in FIG. 11.

FIG. 7*d* shows an outlet and water collection tank in the shape of a "+", enabling the assembly of four elements at each of these ends.

Figure 7G:

FIG. 7*e* represents an outlet and water collection tank typically positioned at the end of the row of tanks. FIG. 7*g* represents a variant shape for the outlet and water collection tank positioned at the end of the row of tanks.

FIG. 7*f* shows an outlet and water collection tank in the shape of a triangle, enabling the assembly of three tanks, each tank being connected to one side of the triangle.

FIG. 8*a* shows a water outlet nozzle 5 of the outlet tank 2. The nozzle 5 here comprises several valves 15 connected to the outlet tank 2 by respective hinges 16, the hinge 16 allowing the valve 15 to swing open when water exits the nozzle 5. Furthermore, as illustrated in FIG. 8*b* showing a horizontal cross-section of a nozzle 5 in one mode of operation, the valve 15 is retained from the inside by a spring 17 fixed on the internal face of the valve 15 on the one hand, and to the outlet tank 2 on the other hand.

In the embodiment where the water infeed is not activated (as illustrated in FIG. 8*b*), the nozzles 5 are in the closed position. The valves 15 have swung closed. The springs 17 are relatively relaxed, not allowing water to flow through the nozzles 5. In the embodiment where the water infeed is activated (as illustrated in FIG. 8*c*), the pressure in the outlet tank 2 increases and pushes on the valves 15 until the valves 15 transition to the open position. The springs 17 are stretched by the water pressure in the tank 2, so that when the pressure in the tank 2 falls back below a threshold, the inward urging of the springs causes the valves to close again. Such an embodiment makes it possible to have an intermittent jet, in drops or segments of water.

FIGS. 9*a* and 9*b* show an embodiment of circular water collection tanks assembled by their side faces (as illustrated in FIG. 9*b*) to form a passage allowing a user to pass through the curtain of water without being sprayed (as shown in FIG. 9*a*). The water flows along the troughs above the passage, and ends up in the collection tanks on the ground, at the sides.

FIG. 10 shows an embodiment where the kit has been assembled into a circular or oval shape, with a diameter sufficient to create a colonnade of water around a space of dimensions that can accommodate several people, or even furniture MOB.

FIG. 11 shows an embodiment of the kit which here forms a heart, in order to illustrate various possible shapes of the kit through the use of specific tank shapes (as illustrated in FIGS. 7*a* to 7*g*).

Of course, the invention is not limited to the embodiments presented above by way of example, but extends to other variants.

For example, there can be multiple shapes created by assembling the kit.

The elements may be fitted together by different means other than those described above (cooperation between protuberance-cavity, internal-external recesses, threading, etc.)

The invention claimed is:

1. A water jet kit for recreational purposes, comprising at least:

at least one water collection tank comprising a trough arranged in an upper portion of the at least one water collection tank, the trough comprising at least a first opening in communication with a lower tank comprised in the at least one water collection tank, in order to collect the water that has flowed into the trough, at least one water outlet tank, provided above the at least one water collection tank, comprising a set of water outlet nozzles and at least one opening that is provided in a lower face of the at least one water outlet tank and oriented towards the at least one water collection tank, the water exiting the set of water outlet nozzles forming free and straight water jets towards the at least one water collection tank such that the water jets form a curtain of water consisting of the water jets between the water outlet nozzles and the at the at least one water collection tank, at least one supply column for the water outlet tank, made of a translucent material in order to blend with the curtain of water, said at least one supply column comprising a first end configured to fit into a second opening of the at least one water collection tank and a second end configured to fit into the opening of the at least one water outlet tank, the material of the at least one supply column being further rigid to support the at least one water outlet tank to be held above the at least one water collection tank, a pump, configured to suck the water that has flowed into the at least one water collection tank and to inject this water into the at least one supply column in order to replenish the at least one water outlet tank with water, and at least a first and a second water outlet tanks, the at least first water outlet tank comprising a cavity on a first side face, and the at least second water outlet tank comprising, on a first side face, a tubing protuberance suitable for being housed in the cavity of the at least first water outlet tank by clipping, such that said tubing protuberance and said cavity enable said at least first and second water outlet tanks to be in communication to allow water to flow freely between said at least first and second water outlet tanks, and such that said at least first and second water outlet tanks are suitable for being assembled to create a water jet kit having a size and shape as desired by a user to enable said user to create a water jet kit according to needs and expectations.

2. A water jet kit for recreational purposes, comprising at least:

at least one water collection tank comprising a trough arranged in an upper portion of the at least one water collection tank, the trough comprising at least a first opening in communication with a lower tank comprised in the at least one water collection tank, in order to collect the water that has flowed into the trough, at least one water outlet tank, provided above the at least one water collection tank, comprising a set of water outlet nozzles and at least one opening that is provided in a lower face of the at least one water outlet tank and oriented towards the at least one water collection tank, the water exiting the set of water outlet nozzles forming a curtain of water consisting of water jets between the water outlet nozzles and the at least one water collection tank, at least one supply column for the water outlet tank, made of a translucent material in order to blend with the curtain of water, said at least one supply column comprising a first end configured to fit into a second opening of the at least one water collection tank and a second end configured to fit into the opening of the at least one water outlet tank, the material of the at least one supply column being further rigid to support the at least one water outlet tank to be held above the at least one water collection tank, a pump, configured to suck the water that has flowed into the at least one water collection tank and to inject this water into the at least one supply column in order to replenish the at least one water outlet tank with water, at least a first and a second water outlet tanks, the at least first water outlet tank comprising a cavity on a first side face, and the at least second water outlet tank comprising, on a first side face, a tubing protuberance suitable for being housed in the cavity of the at least first water outlet tank by clipping, such that said tubing protuberance and said cavity enable said at least first and second water outlet tanks to be in communication to allow water to flow freely between said at least first and second water outlet tanks, and at least a first and a second water collection tanks, the at least first water collection tank comprising an internal recess on a first side face, and the at least second water collection tank comprising an external recess on a first side face, suitable for being housed in the internal recess of the at least first water collection tank, said at least first and second water collection tanks being in communication to allow water to flow freely between said at least first and second water collection tanks, wherein said at least first and second water collection tanks and said at least first and second water outlet tanks are suitable for being assembled to create a water jet kit having a size and shape as desired by a user to enable said user to create a water jet kit according to needs and expectations.

3. The kit according to claim 2, comprising at least a third outlet tank, intermediate between the at least first and the second water outlet tanks, comprising:

on a first side face, a tubing protuberance suitable for being housed in the cavity of the at least first water outlet tank, and on a second side face, a cavity suitable for receiving the tubing protuberance of the at least second water outlet tank.

4. The kit according to claim 3, wherein the first side face of the at least third water outlet tank is opposite to the second side face of the at least third water outlet tank.

5. The kit according to claim 3, wherein the at least third water outlet tank comprises, in addition to the first and second side faces, at least a third side face comprising one element among:

a tubing protuberance suitable for being housed in a water outlet tank cavity, and a cavity suitable for receiving a tubing protuberance of a water outlet tank.

6. The kit according to claim 2, wherein at least one among the at least first and at least second water outlet tanks comprises, on a second side face opposite to the first side face, a partition for closing off the water outlet tank.

7. The kit according to claim 1, comprising at least a first and a second water collection tanks, the at least first water collection tank comprising an internal recess on a first side face, and the at least second water collection tank comprising an external recess on a first side face, suitable for being housed in the internal recess of the at least first water collection tank.

8. The kit according to claim 7, comprising at least a third water collection tank, intermediate between the at least first and the at least second water collection tanks, comprising:

on a first side face, an external recess suitable for being housed in the internal recess of the at least first water collection tank, and on a second side face, an internal recess suitable for receiving the external recess of the at least second water collection tank.

9. The kit according to claim 8, wherein the first side face of the at least third water collection tank is opposite to the second side face of the at least third water collection tank.

10. The kit according to claim 9, wherein the third water collection tank, at least, is shaped to be higher relative to at least one among the at least first and at least second water collection tanks, in order to generate a passage with no water flowing under the at least third water collection tank.

11. The kit according to claim 7, wherein the at least third water collection tank comprises, in addition to the first and second side faces, at least a third side face comprising one among:

a tubing protuberance, suitable for being housed in a cavity of the at least third water collection tank, and a cavity suitable for receiving a tubing protuberance of another water collection tank.

12. The kit according to claim 7, wherein at least one among the at least first and the at least second water collection tanks comprises, on a second side face opposite to the first side face, a partition to close off the at least one among the at least first and the at least second water collection tank.

13. The kit according to claim 1, wherein the at least one supply column is created from a plurality of segments comprising:

a first segment comprising, at least one end, an internal recess, and a second segment comprising, at least one end, an external recess suitable for being housed in the internal recess of the first segment.

14. The kit according to claim 13, wherein the at least one supply column comprises at least a third segment, intermediate between the first and the second segment, comprising:

an external recess at a first end, suitable for being housed in the internal recess of the first segment, and an internal recess at a second end, suitable for receiving the external recess of the second segment.

15. The kit according to claim 1, further comprising:

a flow regulator arranged to increase the flow rate of water from a water infeed, in the event of detecting a pressure in the at least one water outlet tank below a predetermined threshold, a pressure gauge cooperating with the flow regulator to measure pressure in the at least one water outlet tank.

16. The kit according to claim 15, wherein the flow regulator is configured to cut off the supply of water to the set of water outlet nozzles cyclically, and to cause a cyclically interrupted jet to exit each nozzle.

17. The kit according to claim 1, comprising, at least one nozzle outlet for the at least one water outlet tank, and at each nozzle outlet, at least one outwardly opening valve, hinged and urged inward by a spring.

18. The kit according to claim 17, wherein a flow regulator is configured to cut off the supply of water to the set of water outlet nozzles cyclically, and to cause a cyclically interrupted jet to exit each water outlet nozzle of the set of water outlet nozzles, wherein the flow regulator is formed by said at least one outwardly opening valve, in cooperation with the water infeed, and wherein:

a pressure greater than a threshold, for the water coming from the supply column into the at least one water outlet tank, causes the at least one outwardly opening valve to open, and after the at least one outwardly opening valve opens, the release of water from the at least one water outlet tank generates a drop in water pressure in the at least one water outlet tank and causes the at least one outwardly opening valve to close.

19. The kit according to claim 1, comprising an anemometer to identify a wind direction and force and increase a water flow rate.

20. The kit according to claim 1, comprising at least one sensor for detecting the presence of wind and at least cyclically interrupting a water jet according to the force of the wind, into successive water segments or drops.

21. The kit according to claim 1, comprising a sensor for detecting an air displacement, and completely cutting off the pump, in the event of detecting a force of the air displacement that exceeds a threshold.

22. A water jet kit for recreational purposes, comprising at least:

at least one water collection tank comprising a trough arranged in an upper portion of the at least one water collection tank, the trough comprising at least a first opening in communication with a lower tank comprised in the at least one water collection tank, in order to collect the water that has flowed into the trough, at least one water outlet tank, provided above the at least one water collection tank, comprising a set of water outlet nozzles and at least one opening that is provided in a lower face of the at least one water outlet tank and oriented towards the at least one water collection tank, the water exiting the set of water outlet nozzles forming a curtain of water consisting of water jets between the water outlet nozzles and the at least one water collection tank, at least one supply column for the water outlet tank, made of a translucent material in order to blend with the curtain of water, said at least one supply column comprising a first end configured to fit into a second opening of the at least one water collection tank and a second end configured to fit into the opening of the at least one water outlet tank, the material of the at least one supply column being further rigid to support the at least one water outlet tank to be held above the at least one water collection tank, a pump, configured to suck the water that has flowed into the at least one water collection tank and to inject this water into the at least one supply column in order to replenish the at least one water outlet tank with water, and at least a first and a second water outlet tanks, the at least first water outlet tank comprising a cavity on a first side face, and the at least second water outlet tank comprising, on a first side face, a tubing protuberance suitable for being housed in the cavity of the at least first water outlet tank by clipping, such that said tubing protuberance and said cavity enable said at least first and second water outlet tanks to be in communication to allow water to flow freely between said at least a first and a second water outlet tanks, and at least a first and a second water collection tanks, the at least first water collection tank comprising an internal recess on a first side face, and the at least second water collection tank comprising an external recess on a first side face, suitable for being housed in the internal recess of the at least first water collection tank, said at least first and second water collection tanks being in communication to allow water to flow freely between said at least a first and a second water collection tanks, wherein at least one tank of said at least first and second water collection tanks and said at least first and second water outlet tanks is a singularity and has a different shape, wherein said at least first and second water collection tanks, said at least first and second water outlet tanks and said at least one tank that is a singularity and has a different shape are suitable for being assembled to create a water jet kit having a size and shape as desired by a user to enable said user to create a water jet kit according to needs and expectations.

* * * * *